(12) United States Patent
Curcio et al.

(10) Patent No.: US 12,464,103 B2
(45) Date of Patent: Nov. 4, 2025

(54) METHOD, AN APPARATUS AND A COMPUTER PROGRAM PRODUCT FOR VIDEO ENCODING AND VIDEO DECODING

(71) Applicant: Nokia Technologies Oy, Espoo (FI)

(72) Inventors: Igor Danilo Diego Curcio, Gravina di Catania (IT); Saba Ahsan, Espoo (FI)

(73) Assignee: Nokia Technologies Oy, Espoo (FI)

( * ) Notice: Subject to any disclaimer, the term of this patent is extended or adjusted under 35 U.S.C. 154(b) by 268 days.

(21) Appl. No.: 18/252,726

(22) PCT Filed: Jul. 13, 2021

(86) PCT No.: PCT/EP2021/069385
§ 371 (c)(1),
(2) Date: May 12, 2023

(87) PCT Pub. No.: WO2022/100897
PCT Pub. Date: May 19, 2022

(65) Prior Publication Data
US 2023/0421743 A1    Dec. 28, 2023

(30) Foreign Application Priority Data
Nov. 13, 2020 (FI) ...................................... 20206147

(51) Int. Cl.
*H04N 13/194* (2018.01)
*H04N 13/282* (2018.01)
(Continued)

(52) U.S. Cl.
CPC ......... *H04N 13/194* (2018.05); *H04N 13/282* (2018.05); *H04N 13/366* (2018.05); *H04N 23/698* (2023.01); *H04N 13/332* (2018.05)

(58) Field of Classification Search
CPC .. H04N 13/194; H04N 13/282; H04N 13/366; H04N 23/698; H04N 13/332;
(Continued)

(56) References Cited

U.S. PATENT DOCUMENTS

2017/0255372 A1* 9/2017 Hsu ..................... H04N 21/816
2018/0047332 A1* 2/2018 Kuwahara ............ G09G 3/2096
(Continued)

FOREIGN PATENT DOCUMENTS

| WO | 2019/038473 A1 | 2/2019 |
| WO | 2020/033455 A1 | 2/2020 |
| WO | 2021/073940 A1 | 4/2021 |

OTHER PUBLICATIONS

"ITT4RT Permanent Document—Requirements, Working Assumptions and Potential Solutions", 3GPP TSG-SA4 Meeting #110e, S4-201024, Agenda: 11.5, Intel, Version: 0.8.0, Aug. 19-28, 2020, 58 pages.
(Continued)

*Primary Examiner* — Farzana Hossain
(74) *Attorney, Agent, or Firm* — McCarter & English LLP

(57) ABSTRACT

The embodiments relate to a method and technical equipment for consumption of omnidirectional visual media content, comprising receiving from a sender a bitstream defining a presentation, the presentation comprising an omnidirectional visual media content; transmitting the presentation on a receiver device; determining a condition when to send viewport orientation information to the sender, wherein the determining is based on at least a distance relating to a moving viewport and a corresponding threshold; when the determined condition is met, generating a packet comprising the viewport orientation information and sending the packet to the sender; and receiving a presenta-
(Continued)

tion from the sender to be streamed on the receiver device according to the sent viewport orientation.

14 Claims, 8 Drawing Sheets

(51) Int. Cl.
*H04N 13/332* (2018.01)
*H04N 13/366* (2018.01)
*H04N 23/698* (2023.01)

(58) Field of Classification Search
CPC ...... H04N 7/147; H04N 7/15; H04N 21/4728; H04N 21/6587; H04N 21/816; H04N 21/21805
See application file for complete search history.

(56) References Cited

U.S. PATENT DOCUMENTS

| | | | |
|---|---|---|---|
| 2018/0232955 | A1 | 8/2018 | Namgoong et al. |
| 2019/0052838 | A1 | 2/2019 | Ashkenazi et al. |
| 2020/0267384 | A1 | 8/2020 | Doron |
| 2021/0264658 | A1* | 8/2021 | Varekamp ............... G06T 7/74 |
| 2022/0021723 | A1* | 1/2022 | Oyman ................ H04L 65/403 |
| 2022/0078396 | A1* | 3/2022 | Gül ................ H04N 21/41407 |
| 2022/0174259 | A1* | 6/2022 | Van Geest et al. .. H04N 13/194 |

OTHER PUBLICATIONS

Schulzrinne et al., "RTP: A Transport Protocol for Real-Time Applications", RFC 3550, Network Working Group, Jul. 2003, pp. 1-85.

Ott et al., "Extended RTP Profile for Real-time Transport Control Protocol (RTCP) Based Feedback (RTP/AVPF)", RFC 4585, Network Working Group, Jul. 2006, pp. 1-51.

"Information Technology—Coding of Audio-Visual Objects—Part 12: ISO Base Media File Format", ISO/IEC 14496-12, Fifth edition, Dec. 15, 2015, 248 pages.

"Information Technology—Coding of Audio-Visual Objects—Part 14: MP4 File Format", ISO/IEC 14496-14, First edition, Nov. 15, 2003, 18 pages.

"Information Technology—Coding of Audio-Visual Objects—Part 15: Advanced Video Coding (AVC) File Format", ISO/IEC 14496-15, First edition, Apr. 15, 2004, 29 pages.

"High Efficiency Video Coding", Series H: Audiovisual And Multimedia Systems, Infrastructure of audiovisual services—Coding of moving video, Recommendation ITU-T H.265, Feb. 2018, 692 pages.

"Information technology—Coded representation of immersive media (MPEG-I)—Part 2: Omnidirectional media format", ISO/IEC JTC 1/SC 29/WG 11, ISO/IEC FDIS 23090-2:201x (E), Apr. 26, 2018, 182 pages.

Office action received for corresponding Finnish Patent Application No. 20206147, dated Mar. 31, 2021, 11 pages.

"ITT4RT Permanent Document—Requirements, Working Assumptions and Potential Solutions", 3GPP TSG-SA4 Meeting #111e, S4-201319, Agenda: 11.5, Intel, Version: 0.9.0, Nov. 11-20, 2020, 67 pages.

Curcio et al., "Viewport Margins for 360-Degree Immersive Video", IEEE 22nd International Workshop on Multimedia Signal Processing (MMSP), Sep. 21-24, 2020, 6 pages.

International Search Report and Written Opinion received for corresponding Patent Cooperation Treaty Application No. PCT/EP2021/069385, dated Sep. 24, 2021, 12 pages.

"Event-based trigger interval for signalling of RTCP viewport", 3GPP TSG-SA4, S4-AHM560, Tencent, Jul. 8, 2020, 2 pages.

* cited by examiner

METHOD, AN APPARATUS AND A COMPUTER PROGRAM PRODUCT FOR VIDEO ENCODING AND VIDEO DECODING

RELATED APPLICATION

This application was originally filed as PCT Application No. PCT/EP2021/069385, filed on Jul. 13, 2021, which claims priority from Finnish Application No. 20206147, filed on Nov. 13, 2020, each of which is incorporated herein by reference in its entirety.

TECHNICAL FIELD

The present solution generally relates to video encoding and/or transmission and video decoding and/or reception.

BACKGROUND

Devices that are able to capture image and video have evolved from devices capturing a limited angular field of view to devices capturing 360-degree content. These devices are able to capture visual and audio content all around them, i.e. they can capture the whole angular field of view, which may be referred to as 360 degrees field of view. More precisely, the devices can capture a spherical field of view (i.e., 360 degrees in all spatial directions). In addition to the new types of image/video capturing devices, also new types of output technologies have been invented and produced, such as head-mounted displays. These devices allow a person to see visual content all around him/her, giving a feeling of being "immersed" into the scene captured by the 360 degrees camera. The new capture and display paradigm, where the field of view is spherical, is commonly referred to as virtual reality (VR) and is believed to be the common way people will experience media content in the future.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

Various aspects include a method, an apparatus and a computer readable medium comprising a computer program stored therein, which are characterized by what is stated in the independent claims. Various embodiments are disclosed in the dependent claims.

According to a first aspect, there is provided a method for consumption of omnidirectional visual media content, comprising receiving from a sender a bitstream defining a presentation, the presentation comprising an omnidirectional visual media content; transmitting the presentation on a receiver device; determining a condition when to send viewport orientation information to the sender, wherein the determining is based on at least a distance relating to a moving viewport and a corresponding threshold; when the determined condition is met, generating a packet comprising the viewport orientation information and sending the packet to the sender; and receiving a presentation from the sender to be streamed on the receiver device according to the sent viewport orientation.

According to a second aspect, there is provided an apparatus comprising means for receiving from a sender a bitstream defining a presentation, the presentation comprising an omnidirectional visual media content; means for transmitting the presentation on a receiver device; means for determining a condition when to send viewport orientation information, wherein the determining is based on at least a distance relating to a moving viewport and a corresponding threshold; means for generating a packet comprising the viewport orientation information and means for sending the packet to the sender, when the determined condition is met; and means for receiving a presentation from the sender to be streamed on the receiver device according to the sent viewport orientation.

According to a third aspect, there is provided an apparatus comprising at least one processor, memory including computer program code, the memory and the computer program code configured to, with the at least one processor, cause the apparatus to perform at least the following:
receive from a sender a bitstream defining a presentation, the presentation comprising an omnidirectional visual media content;
transmit the presentation on a receiver device;
determine a condition when to send viewport orientation message based on a moving viewport, wherein the determining is based on at least a distance relating to the moving viewport and a corresponding threshold;
generate a packet comprising the viewport orientation information and send the packet to the sender, when the determined condition is met; and
receive a presentation from the sender to be streamed on the receiver device according to the sent viewport orientation.

According to a fourth aspect, there is provided a computer program product comprising computer program code configured to, when executed on at least one processor, cause an apparatus or a system to:
receive from a sender a bitstream defining a presentation, the presentation comprising an omnidirectional visual media content;
transmit the presentation on a receiver device;
determine a condition when to send viewport orientation message based on a moving viewport, wherein the determining is based on at least a distance relating to the moving viewport and a corresponding threshold;
generate a packet comprising the viewport orientation information and send the packet to the sender, when the determined condition is met; and
receive a presentation from the sender to be streamed on the receiver device according to the sent viewport orientation.

According to an embodiment, the distance is a distance between the moving viewport and a margin boundary.

According to an embodiment, information on a margin is received from the sender.

According to an embodiment, a velocity of a rendering device is determined at a given tie instance or continuously.

According to an embodiment, the distance is used with the determined velocity for calculating time for the moving viewport to reach the margin boundary.

According to an embodiment, the distance is a distance between a center of the sent viewport orientation and the center of the moving viewport.

According to an embodiment, the determined velocity is used with the distance to determine the condition for the viewport orientation message.

According to an embodiment, sending a unscheduled viewport orientation message is prevented when the time to next scheduled viewport orientation message is shorter than a defined threshold.

According to an embodiment, the computer program product is embodied on a non-transitory computer readable medium.

DESCRIPTION OF THE DRAWINGS

In the following, various embodiments will be described in more detail with reference to the appended drawings, in which.

DESCRIPTION OF EXAMPLE EMBODIMENTS

Figure 1:
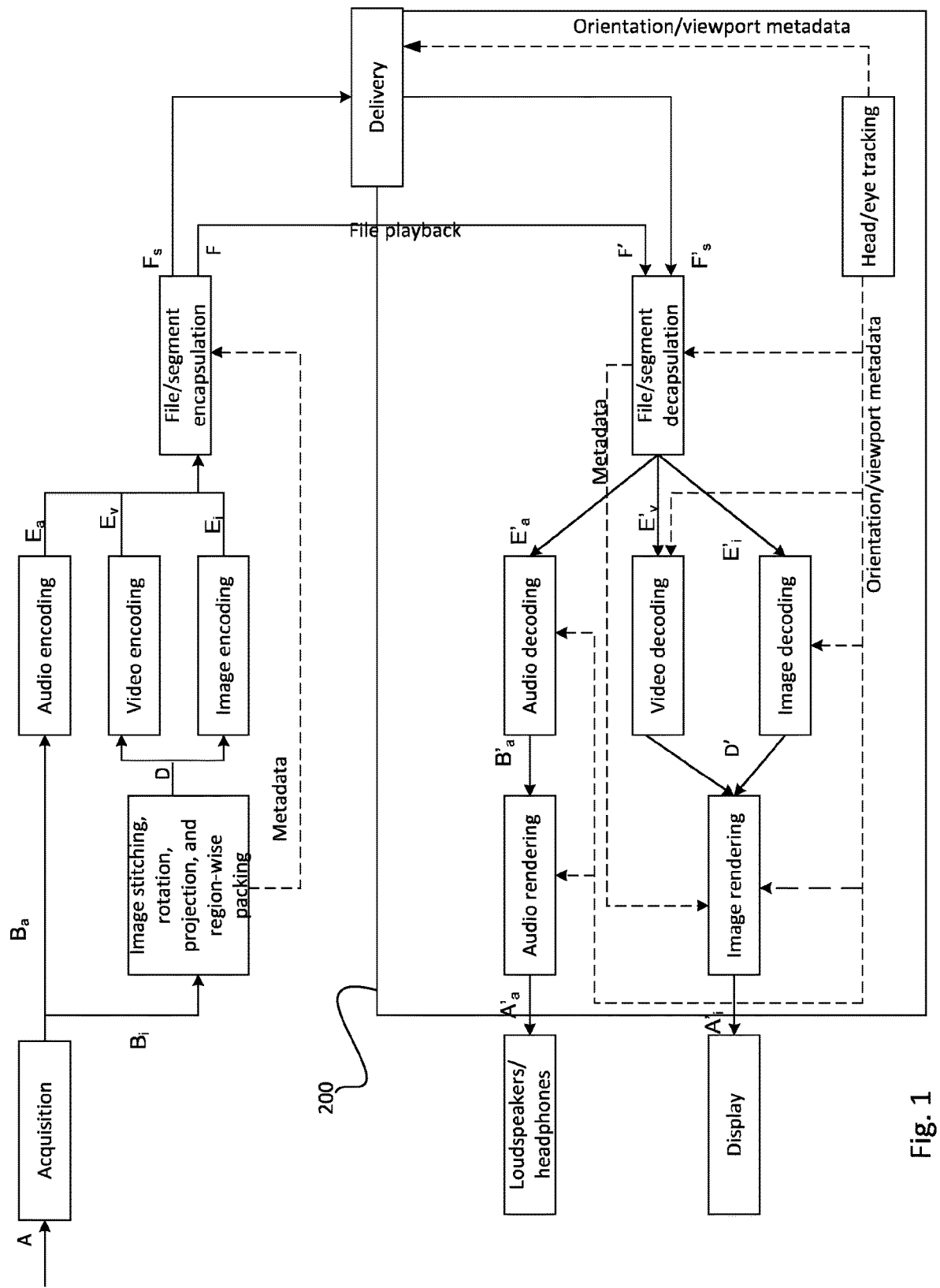
FIG. 1 shows an example of an OMAF end-to-end system.

The present embodiments enable immersive content consumption on a device, when the content is being sent over the network, for example in an omnidirectional video telephony. Thus, present embodiments are applicable in 360-degree conferencing. It is to be noted, however, that the invention is not limited to 360-degree conferencing. In fact, the different embodiments have applications in any environment, where video delivery is performed.

Since the beginning of photography and cinematography, the most common type of image and video content has been captured by cameras with relatively narrow field of view and displayed as a rectangular scene on flat displays. Such content may be referred as "flat content", or "flat image", or "flat video". The cameras are mainly directional, whereby they capture only a limited angular field of view (the field of view towards which they are directed). Such a flat video is output by a display device capable of displaying two-dimensional content.

More recently, new image and video capture devices have become available. These devices are able to capture visual and audio content all around them, i.e. they can capture the whole angular field of view, sometimes referred to as 360 degrees field of view. More precisely, they can capture a spherical field of view (i.e., 360 degrees in all spatial directions). Furthermore, new types of output such as head-mounted displays, and other devices, allow a person to see the 360-degree visual content.

Available media file format standards include International Standards Organization (ISO) base media file format (ISO/IEC 14496-12, which may be abbreviated ISOBMFF), Moving Picture Experts Group (MPEG)-4 file format (ISO/IEC 14496-14, also known as the MP4 format), file format for NAL (Network Abstraction Layer) unit structured video (ISO/IEC 14496-15).

Some concepts, structures, and specifications of ISOBMFF are described below as an example of a container file format, based on which the embodiments may be implemented. The aspects of the invention are not limited to ISOBMFF, but rather the description is given for one possible basis on top of which the invention may be partly or fully realized. The embodiments of the present invention may also be implemented using other transport protocols, such as the Real-Time Transport Protocol (RTP) as described below. In general, the information transmitted to implement this invention can be transmitted using any protocol and any layers of the ISO (International Standardization Organization) OSI (Open Systems Interconnection) protocol stack.

High Efficiency Image File Format (HEIF) is a standard developed by the Moving Picture Experts Group (MPEG) for storage of images and image sequences. Among other things, the standard facilitates file encapsulation of data coded according to the High Efficiency Video Coding (HEVC) standard. HEIF includes features building on top of the used ISO Base Media File Format (ISOBMFF).

The ISOBMFF structures and features are used to a large extent in the design of HEIF. The basic design for HEIF comprises that still images are stored as items and image sequences are stored as tracks.

In the following, term "omnidirectional" refers to media content that may have greater spatial extent than a field-of-view of a device rendering the content. Omnidirectional content may for example cover substantially 360 degrees in the horizontal dimension and substantially 180 degrees in the vertical dimension, but omnidirectional may also refer to content covering less than 360 degree view in the horizontal direction and/or 180 degree view in the vertical direction.

A panoramic image covering a 360-degree field-of-view horizontally and a 180-degree field-of-view vertically can be represented by a sphere that has been mapped to a two-dimensional image plane using the equirectangular projection (ERP). In this case, the horizontal coordinate may be considered equivalent to a longitude, and the vertical coordinate may be considered equivalent to a latitude, with no transformation or scaling applied. In some cases, panoramic content with a 360-degree horizontal field-of-view, but with less than a 180-degree vertical field-of-view may be considered special cases of equirectangular projection, where the polar areas of the sphere have not been mapped onto the two-dimensional image plane. In some cases, panoramic content may have less than a 360-degree horizontal field-of-view and up to a 180-degree vertical field-of-view, while otherwise having the characteristics of an equirectangular projection format.

Immersive multimedia, such as omnidirectional content consumption is more complex for the end user compared to the consumption of 2D content. This is due to the higher degree of freedom available to the end user. The freedom also results in more uncertainty. The MPEG Omnidirectional Media Format (OMAF) v1 standardized the omnidirectional streaming of single 3DoF (3 Degrees of Freedom) content (where the viewer is located at the centre of a unit sphere and has three degrees of freedom (Yaw-Pitch-Roll). The following phase standardization for the OMAF v2 is close to completion. This phase is expected to enable multiple 3DoF and 3DoF+ content consumption with user interaction by means of overlays and multi-viewpoints, and means to optimize the Viewport Dependent Streaming (VDS) operations and bandwidth management.

A viewport may be defined as a region of omnidirectional image or video suitable for display and viewing by the user. A current viewport (which may be sometimes referred simply as a viewport) may be defined as the part of the spherical video that is currently displayed and hence is viewable by the user(s). At any point of time, a video rendered by an application on a head-mounted display (HMD) renders a portion of the 360-degrees video, which is referred to as a viewport. Likewise, when viewing a spatial part of the 360-degree content on a conventional display, the spatial part that is currently displayed is a viewport. A viewport is a window on the 360-degree world represented in the omnidirectional video displayed via a rendering display. A viewport may be characterized by a horizontal field-of-view (VHFoV) and a vertical field-of-view (VVFoV).

The 360-degree space may be divided into a discrete set of viewports, each separated by a given distance (e.g., expressed in degrees), so that the omnidirectional space can be imagined as a map of overlapping viewports, and the viewport is switched discretely as the user changes his/her orientation while watching content with a head-mounted display (HMD). When the overlapping between viewports is reduced to zero, the viewports can be imagined as adjacent non-overlapping tiles within the 360-degree space. The H.265 video codec implements the concept of tiles which may be used to realize this scenario (both overlapping and not).

When transmitting omnidirectional video, a subset of 360-degree video content covering the viewport (i.e., the current view orientation) may be transmitted at the best quality/resolution, while the remaining of 360-degree video may be transmitted at a lower quality/resolution. This is what characterizes a VDS systems, as opposed to a Viewport Independent Streaming system, where the omnidirectional video is streamed at high quality in all directions of the 360 degree space.

The Omnidirectional Media Format (OMAF) standard (ISO/IEC 23090-2) specifies a generic timed metadata syntax for sphere regions. A purpose for the timed metadata track is indicated by the track sample entry type. The sample format of all metadata tracks for sphere regions specified starts with a common part and may be followed by an extension part that is specific to the sample entry of the metadata track. Each sample specifies a sphere region.

One of the specific sphere region timed metadata tracks specified in OMAF is known as a recommended viewport timed metadata track, which indicates the viewport that should be displayed when the user does not have control of the viewing orientation or has released control of the viewing orientation. The recommended viewport timed metadata track may be used for indicating a recommended viewport based on a "director's cut" or based on measurements of viewing statistics. A textual description of the recommended viewport may be provided in the sample entry. The type of the recommended viewport may be indicated in the sample entry and may be among the following: A recommended viewport per the director's cut, e.g., a viewport suggested according to the creative intent of the content author or content provider.

FIG. 1 illustrates the OMAF system architecture. The system can be situated in a video camera, or in a network server, for example. As shown in FIG. 1, an omnidirectional media (A) is acquired. If the OMAF system is part of the video source, the omnidirectional media (A) is acquired from the camera means. If the OMAF system is in a network server, the omnidirectional media (A) is acquired from a video source over network.

The omnidirectional media comprises image data (BO and audio data (B a), which are processed separately. In image stitching, rotation, projection and region-wise packing, the images/video of the source media and provided as input (Bi) are stitched to generate a sphere picture on a unit sphere per the global coordinate axes. The unit sphere is then rotated relative to the global coordinate axes. The amount of rotation to convert from the local coordinate axes to the global coordinate axes may be specified by the rotation angles indicated in a RotationBox. The local coordinate axes of the unit sphere are the axes of the coordinate system that has been rotated. The absence of the RotationBox indicates that the local coordinate axes are the same as the global coordinate axes. Then, the spherical picture on the rotated unit sphere is converted to a two-dimensional projected picture, for example using the equirectangular projection. When spatial packing of stereoscopic content is applied, two spherical pictures for the two views are converted to two constituent pictures, after which frame packing is applied to pack the two constituent picture on one projected picture. Rectangular region-wise packing can then be applied to obtain a packed picture from the projected picture. The packed pictures (D) are then provided for video and image encoding to result in encoded image ($E_i$) and/or encoded video stream ($E_v$). The audio of the source media is provided as input ($B_a$) to audio encoding that provides as an encoded audio ($E_a$). The encoded data ($E_i$, $E_v$, $E_a$) are then encapsulated into file for playback (F) and delivery (i.e. streaming) ($F_s$).

In the OMAF player 200, such as in a HMD, a file decapsulator processes the files (F', F'$_s$) and extracts the coded bitstreams (E'$_i$, E'$_v$, E'$_a$) and parses the metadata. The audio, video and/or images are then decoded into decoded data (D', B'$_a$). The decoded pictures (D') are projected onto a display according to the viewport and orientation sensed by a head/eye tracking device. Similarly, the decoded audio (B'$_a$) is rendered through loudspeakers/headphones.

The Matroska file format is capable of (but not limited to) storing any of video, audio, picture, or subtitle tracks in one file. Matroska may be used as a basis format for derived file formats, such as WebM. Matroska uses Extensible Binary Meta Language (EBML) as basis. EBML specifies a binary and octet (byte) aligned format inspired by the principle of XML. EBML itself is a generalized description of the technique of binary markup. A Matroska file consists of Elements that make up an EBML "document." Elements incorporate an Element ID, a descriptor for the size of the element, and the binary data itself. Elements can be nested. A Segment Element of Matroska is a container for other top-level (level 1) elements. A Matroska file may comprise (but is not limited to be composed of) one Segment. Multimedia data in Matroska files is organized in Clusters (or Cluster Elements), wherein each may contain a few seconds of multimedia data. A Cluster comprises BlockGroup elements, which in turn comprise Block Elements. A Cues Element comprises metadata which may assist in random access or seeking and may include file pointers or respective timestamps for seek points.

A transmission channel or a communication channel or a channel may refer to either a physical transmission medium, such as a wire, or to a logical connection over a multiplexed medium.

RTP is widely used for real-time transport of timed media such as audio and video. RTP may operate on top of the User Datagram Protocol (UDP), which in turn may operate on top of the Internet Protocol (IP). RTP is specified in Internet Engineering Task Force (IETF) Request for Comments (RFC) 3550, available from www.ietf.org/rfc/rfc3550.txt. In RTP transport, media data is encapsulated into RTP packets. Typically, each media type or media coding format has a dedicated RTP payload format.

An RTP session is an association among a group of participants communicating with RTP. It is a group communications channel which can potentially carry a number of RTP streams. An RTP stream is a stream of RTP packets comprising media data. An RTP stream is identified by an SSRC belonging to a particular RTP session. SSRC refers to either a synchronization source or a synchronization source identifier that is the 32-bit SSRC field in the RTP packet header. A synchronization source is characterized in that all packets from the synchronization source form part of the same timing and sequence number space, so a receiver device may group packets by synchronization source for playback. Examples of synchronization sources include the sender of a stream of packets derived from a signal source such as a microphone or a camera, or an RTP mixer. Each RTP stream is identified by a SSRC that is unique within the RTP session.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

Figure 2A:
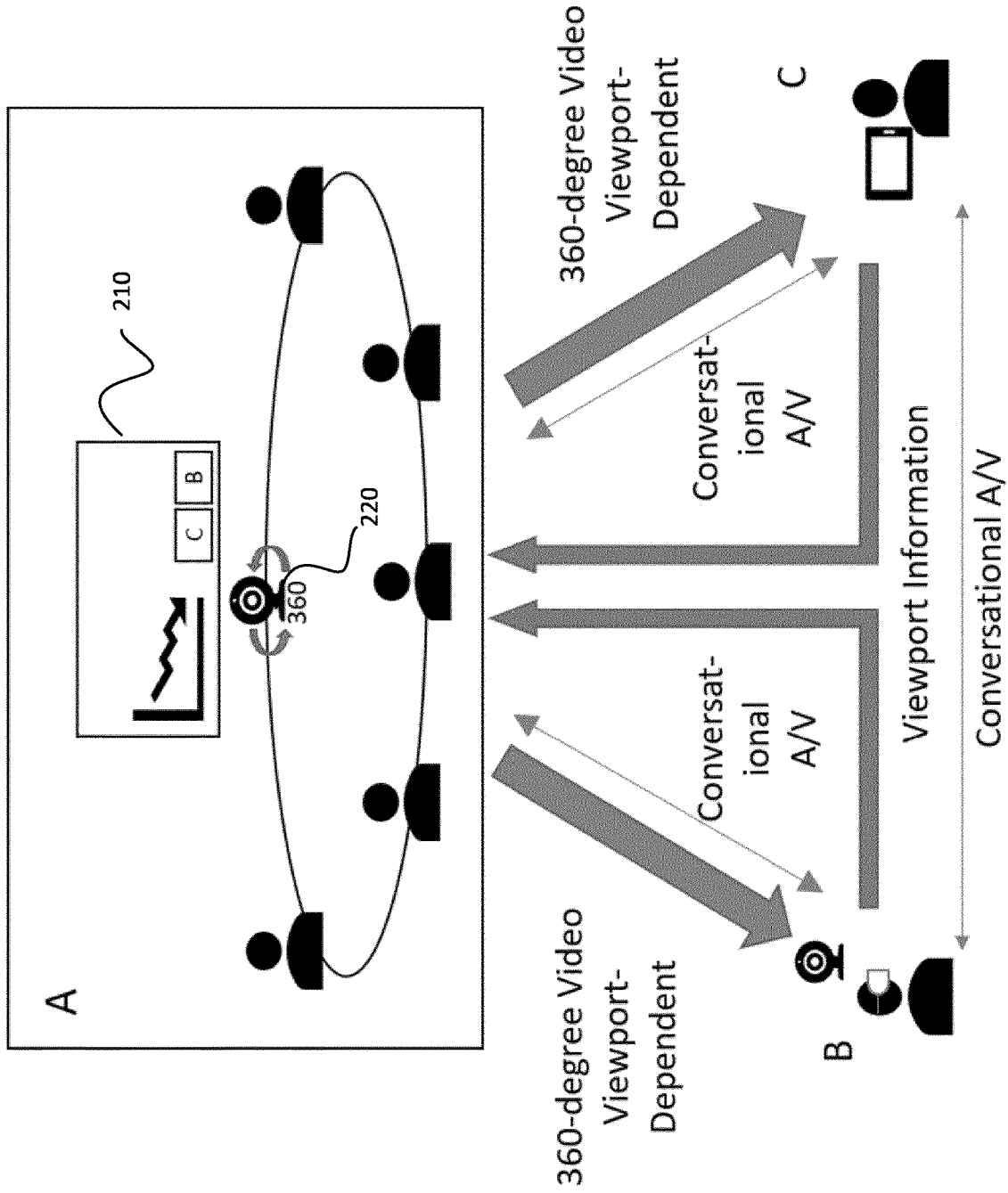
FIG. 2a-b show examples of a conference room with participants.
Figure 2B:
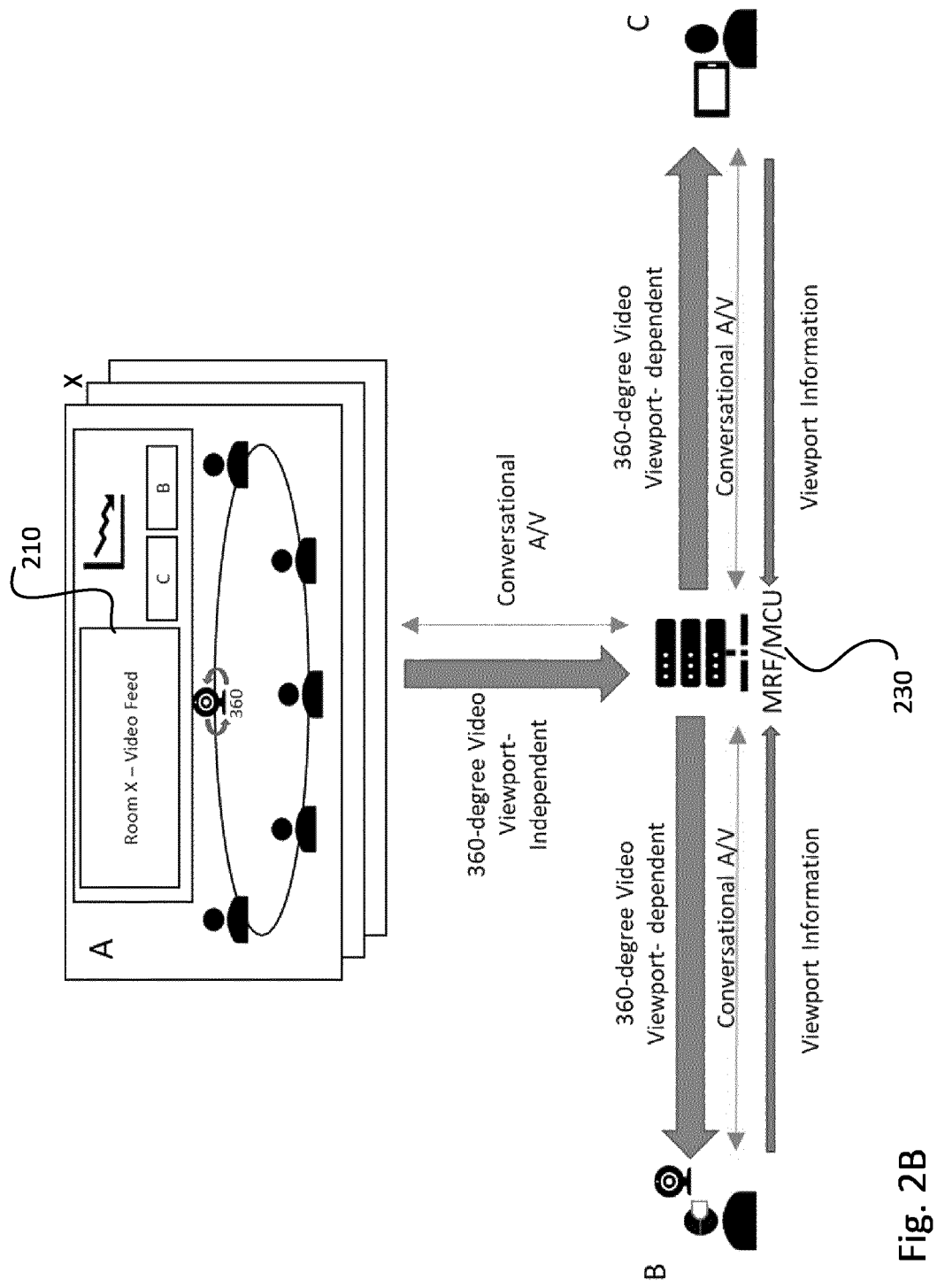

In the following, embodiments for a 360-degree event, such as a 360-degree conference, teleconference, telepresence, are discussed. However as was mentioned, in addition to the 360-degree conference, the embodiments are suitable for other delivery solutions, as well. FIGS. 2a-2b represent various scenarios for a 360-degree teleconference. A 360-degree conference can be a live meeting which is delivered to a receiver device(s) by the sender, wherein the sender is a video source, such as a 360-degree (i.e. omnidirectional) camera, or a system being operatively connected to a video source or comprising means to capture video. The streamable content from the sender to the receiver comprises at least video or audio. The purpose of the sender is to deliver video being captured forward to receiver device(s). The sender may also comprise means for receiving at least audio data from receiver device(s), and output the received audio data to the participants of the event.

In FIGS. 2a-2b a group of participants is having a meeting in a conference room. The conference room can be considered as a virtual conference system A with physical elements (i.e., camera 220, view screen 210, physical participants) being able to share content to and to receive data from remote participants. According to an example, the virtual conference system A may comprise a 360-degree (i.e., omnidirectional) camera 220 and a view screen 210. The meeting is also participated by two remote participants B, C through a conference call. Physical participants of the virtual conference system A use the view screen 210 to display a shared presentation and/or video streams coming from the remote participants B, C. One of the remote participants B is using a head mounted display for having a 360-degree view to conference content and a camera that captures his/her video. One of the remote participants C uses a mobile phone to access the conference. The mobile phone is able to show a 360-degree video on the conference and to capture his/her video.

In the example of FIG. 2a, the conference call is set up without any media-aware network elements. Both remote participants B, C send information about their viewport to the virtual conference system A, which in turn sends them a viewport-dependent video stream from the 360-degree camera 220.

In the example of FIG. 2b, the conference call is set up using a network function, which may be performed by media function such as a Media Resource Function (MRF) or a Media Control Unit (MCU) 230. The virtual conference system for multiple conference rooms X are sending 360-degree video to an MRF/MCU 230. The rooms may choose to receive 2D video streams from other participants including one of the other rooms, which is displayed on the view screen 210 in the room. The remote participants B, C can choose to view any one or none of the available 360-degree videos from the multiple rooms. Switching from one room to another may be triggered manually, or using other mechanisms, such as viewing direction or dominant speaker. The MRF/MCU 230 may signal to pause the receiving 360-degree video from any of the rooms that do not currently have any active viewers.

In some embodiments, the 360-degree conference can be completely virtual, where all the meeting participants are remote participants, i.e. receiver devices connecting to the conference via a network, and where the sender is a computer generating a virtual representation of the virtual conference and the remote participants.

Head mounted display is a device capable of showing three-dimensional (3D) content. For that purpose, a head mounted display may comprise two screen sections or two screens for displaying images for left and right eyes. The displays are close to the eyes, and therefore lenses are used to make the images easily viewable and for spreading the images to cover as much as possible of the eyes' field of view. The HMD is attached to the head of the user so that it stays in place even when the user turns his head. The device may have an orientation detecting module for determining the head movements and direction of the head. The head mounted display gives a three-dimensional (3D) perception of the recorded/streamed content to a user. The user of the head mounted display sees, at a given time instant, only a portion of 360-degree content, referred to as viewport, the size of which is being defined by the vertical and horizontal field-of-views of the HMD. Most of the audio objects of the immersive content may be visible in the viewport, while some audio objects may reside behind the user, therefore being non-visible in the viewport. As mentioned, viewport is a portion of 360-degree content. Therefore, "viewport" is a term for defining a region of omnidirectional image or video suitable for display and viewing by the user, and is defined as the part of the spherical video that is currently displayed and hence is viewable by the user(s).

For determining the viewport, a conferencing system (comprising both sender and receiver) may support 3DoF. A system supporting 3DoF allows rotational head motion around yaw, pitch and roll. In another embodiment, 6DoF (6 Degrees of Freedom) motion may be supported. 6DoF allows further translational head or body movements, in addition to the rotational movements, e.g., translationally moving head or body up, down, right, left, forwards and backwards, including walking around a space in any direction. 6DoF motion may be constrained to a defined space within which the user can move around (e.g., 3DoF+) or unconstrained.

The conference session may be established using session protocols, e.g. SDP (Session Description Protocol) and SIP (Session Initiation Protocol). The media streams may be carried using real-time transport protocols with media control protocols, e.g. RTP, RTCP (Real-time Control Protocol), SCTP (Stream Control Transmission Protocol), etc. In RTP transmission of omnidirectional video, RTCP (or RTP in the backward direction) may also be employed to convey viewport information to the sender. In practice, the HMD orientation is signaled to the sender, such that the sender can deliver the stream with the new viewport.

Transmission of RTCP viewport information may occur at constant rate or event-based. At constant rate, the viewport information may be sent e.g. every X milliseconds to the sender, irrespective of the head motion. At event-based, the sending of the viewport information may be triggered by the "head motion" event. ITT4RT (Immersive Teleconferencing and Telepresence for Remote Terminals) implementations may benefit from a mix of both approaches.

The present embodiments are targeted to provide RTCP protocol management to convey viewport information from the receiver to the sender. In other words, the present embodiments are targeted to feedback coupled with viewport dependent delivery.

Thus, the present embodiments enable an early RTCP feedback for signalling viewport for a RTP based immersive media session. An early RTCP feedback is defined as a feedback message sent earlier than its next scheduled transmission time, according to RFC 4585 "Extended RTP Profile for Real-time Transport Control Protocol (RTCP)-Based Feedback (RTP/AVPF)" (July 2006). An RTCP feedback is defined to be a RTCP packet containing, among other information, the viewport orientation information. It defines a trigger that initiates an early RTCP feedback (e.g., earlier than the next constant rate RTCP feedback packet). The trigger should be generally a function of the RTCP reporting rate and the size of the viewport margin in the direction of motion. Viewport margins are defined as a spatial extension of the viewport. In other words, they are extra borders which are added to the user's viewport in order to build a high-quality safety area around it. Margins may extend the viewport along one direction (e.g., horizontal), by adding an extra boundary to the left and right sides of the viewport, in order to handle horizontal head motion. In a complete solution, margins could extend the viewport in both the horizontal and vertical directions, in order to handle any possible head motion. Viewport margins could be defined as a spatial viewport extension in terms of number of degrees (e.g., 30 degrees margins in all directions, or 30 degrees in the horizontal direction and 20 degrees in the vertical direction) or as a percentage of the viewport FoV size (e.g., 20% extra FoV in all directions) or expressed in terms of resolution (e.g., number of extra pixels in any direction). There can be two types of viewport margins: symmetric margins and directional margins. Symmetric margins extend the viewport symmetrically on both sides along one direction. For example, 30 degrees total extra margin, which means half of it respectively to the left and the right sides of the viewport and 20 degrees total extra margin which means half of it to each of the top and bottom sides of the viewport, are a possible way to define static symmetric margins. Directional margins are dynamic in nature. The idea is that a margin would dynamically expand in the same direction of the head motion until the motion stops or until a given maximum margin size is reached. At the same time, the viewport margin in the opposite direction to the motion (but along the same axis) would shrink of the same amount of degrees (or percentage or pixels). The shrink would be down to the minimum (i.e., zero) as the margin extension reaches the maximum on the other side.

The trigger can be the viewport crossing the High Quality region (e.g., margins) or the number of degrees moved in any direction. The present embodiments make use of a "Suppression threshold", i.e. if the time to the next scheduled RTCP feedback is short, the receiver does not send the early feedback and waits for the next scheduled (e.g., constant rate) RTCP feedback packet. Since RTCP is an example of an embodiment, the present solution is applicable for signalling any type of feedback comprising viewport information.

In the following, two examples for the RTCP feedback trigger are disclosed.

Example 1

In the first example, the trigger point is based on the velocity and the direction of the head motion (being tracked by—for example—the head mounted display or any other rendering device), and the high-quality region, viewport and margin, in the currently delivered video content. It is assumed that the content sender signals information about margins (maximum and/or minimum extent of the margin around the viewport) to the receiver(s). According to another embodiment, the receiver is aware of the viewport and margin extent through other means. The receiver is configured to send the feedback with the viewport orientation information. This first example has two variations, which are discussed next:

Variation A of Example 1

Figure 3:
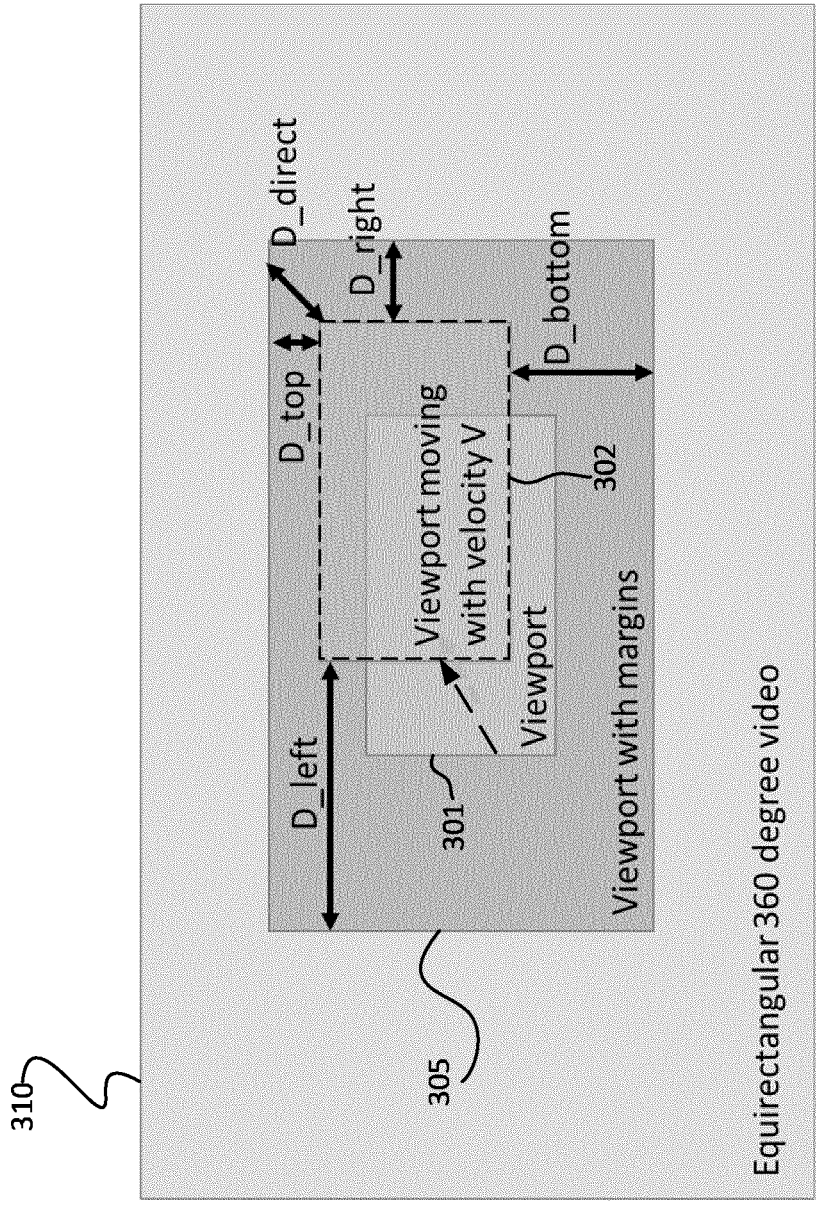
FIG. 3 shows an example of an equirectangular picture with a moving viewport.

In the Variation A of the Example 1, the receiver is configured to determine the viewport feedback as a function of the following three parameters:

velocity of the head (V) (i.e. velocity of a rendering device) moving between two arbitrary positions of the 360 degree space, and assuming the starting velocity is zero or negligible at the beginning of the motion;

remaining distance D to the end (i.e., edge) of the margin (either static or dynamic margins can be used), wherein D is the distance between the viewport boundary and the margin boundary (in number of degrees/pixels) in the direction of the motion calculated at the time instant the early viewport feedback is intended to be sent from receiver to sender (see FIG. 3 where different remaining distances Ds are indicated for different directions).

time T to next scheduled viewport feedback.

FIG. 3 illustrates an equirectangular 360-degree projected picture 310. A viewport is referred to with a refence number 301. A moving viewport 302 is shown on the equirectangular 360-degree projected picture 310, where the high-quality region (viewport with margins) is referred to with a reference number 305, and the low-quality region is referred to with a reference number 310. The trigger point depends on the velocity V, and the remaining distance D, to the boundary of the high-quality region 305. It is to be noticed that the distance D indicates the distance between the viewport boundary and the margin boundary. In practice, D is made of four variables (D_top, D_bottom, D_right, D_left) indicating the distance of each of the viewport margins in all directions: top, bottom, right, left. D_direct is the shortest direct distance from a point on the boundary of the viewport to a point on the boundary of the high-quality region in the direction of motion.

The velocity V may be locally calculated by the receiver from an API from the HMD interface. Two embodiments for calculating the velocity V is given in below:

1) The velocity V can be determined at a given time instant (event-triggered) within a constant time interval I in [HST, IET].

Head Start Time (HST): the time the rendering device started its motion (i.e. controlled by user's head) by an amount Y of degrees/pixels above a given threshold Y';

Interval End Time (IET): time that defines the end of the interval used for velocity calculation (e.g., a reasonably short constant).

2) Alternatively, the velocity V can be determined continuously, i.e. as an always-running velocity algorithm that allows querying the "head_velocity_function" from the HMD APIs whenever needed. In this case, the algorithm should also contain a weighting function that gives less weight to the past sampled velocity values, and more weight to the most recent ones. More important, the function automatically "cancels" fast movements occurred in opposite directions within very small time units.

Figure 4:
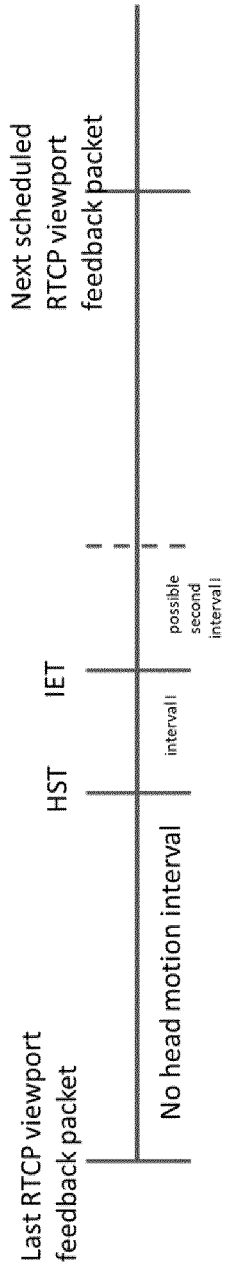
FIG. 4 shows an example of intervals used in the calculation of a velocity.
Figure 5:
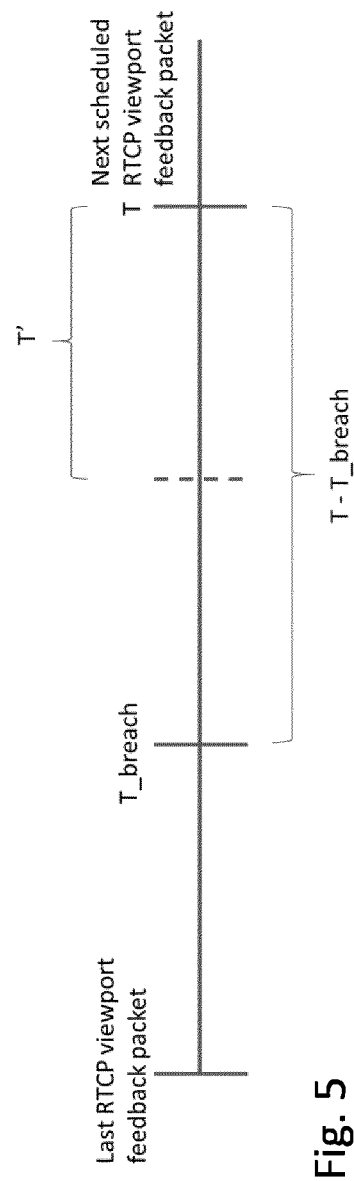
FIG. 5 shows an example of a timeline showing parameters T, T' and T_breach.

FIG. 4 illustrates an example on intervals used in the calculation of velocity V shown on a timeline; time increases from left to right.

The receiver's RTCP logic comprises the following steps:
1. If the velocity V is greater than a given threshold V' AND the remaining distance D to the end of the margin is smaller than a given threshold D', then the early RTCP viewport feedback is sent;
2. If the time T to the next RTCP viewport feedback is smaller than a given threshold T', suppress the next scheduled RTCP viewport feedback.

The thresholds V', D', T' can be signalled from a sender to a receiver (or vice versa) via SDP or other suitable protocol. In other embodiments, the thresholds may be a function of the device, application or constants that are set through other means.

The variation A has advantages. For example, the trigger is independent of the past RTCP viewport feedback so the receiver does not need to keep state. The solution also considers the speed of the head and can differentiate between fast and slow viewport changes and react accordingly.

Variation B of Example 1

In the variation B, the early RTCP viewport feedback is calculated by a receiver as a function of the following two parameters:
1. Remaining time until the viewport boundary reaches the High Quality (HQ) region boundary (possibly including margin area) at current velocity
   T_breach=Predicted time for the viewport boundary to reach the HQ region boundary
2. Time T to next scheduled RTCP viewport feedback Considering FIG. 3, T_breach is the time it will take for the viewport to reach the boundary of the margins at the current speed and trajectory. The calculation of T_breach may be an operation of the receiver application.

T_breach may be calculated based on the viewport speed and trajectory. According to an embodiment, the velocity of the head and distance may be used:

Velocity of the head V (i.e. velocity of a rendering device) can be locally calculated in similar fashion as in Variation A of Example 1;

Based on the velocity V and the distance between the viewport and margin boundary (same as D in Variation A of Example 1), T_breach can be calculated.

Receiver's RTCP logic comprises the following steps:
Send the early RTCP viewport feedback if
T−T_breach>T',
where T is the time to next scheduled RTCP report. The viewport at current speed will breach the HQ region at least T' seconds before the next scheduled RTCP feedback.

The previous operation is clarified with an example, where time for next scheduled RTCP feedback packet T is 800 ms (T=800). Estimated time to reach HQ region T_breach is 500 ms (T_breach=500). Minimum threshold for sending an early RTCP feedback T' is 200 ms (T'=200). Then T−T_breach=300, which is greater than T'. Thus, early feedback will be sent.

The threshold T' can be signalled from sender to receiver (or vice versa) via SDP or other suitable protocol. In other embodiments, the threshold may be a function of the device, application or constants that are set through other means.

The benefits of the variation B of Example 1 are, for example, that the trigger is independent of the past RTCP viewport feedback so the receiver does not need to keep state. The solution also considers the speed of the head and can differentiate between fast and slow viewport changes and react accordingly. In addition, a single threshold is used based on time. The variation B can be implemented using a single threshold set by the sender for a minimum interval between viewport reports (both regular and early feedbacks).

Example 2

The second example does not assume the use of viewport margins. The decision is based on the content of the last sent viewport feedback and the spatial distance covered by the viewport since then. The solution is independent of the boundary of high-quality region in the received content. It assumes that the sender will provide the highest possible quality content based on its ability and strives to only keep the viewport information at the sender as updated as possible regardless of what the currently delivered high-quality region is.

The early RTCP viewport feedback trigger is a function of Time T to the next scheduled RTCP viewport feedback.

D=distance between the center of the viewport sent in the last RTCP viewport feedback and the center of the current viewport (expressed in number of degrees/pixels).

Figure 6:
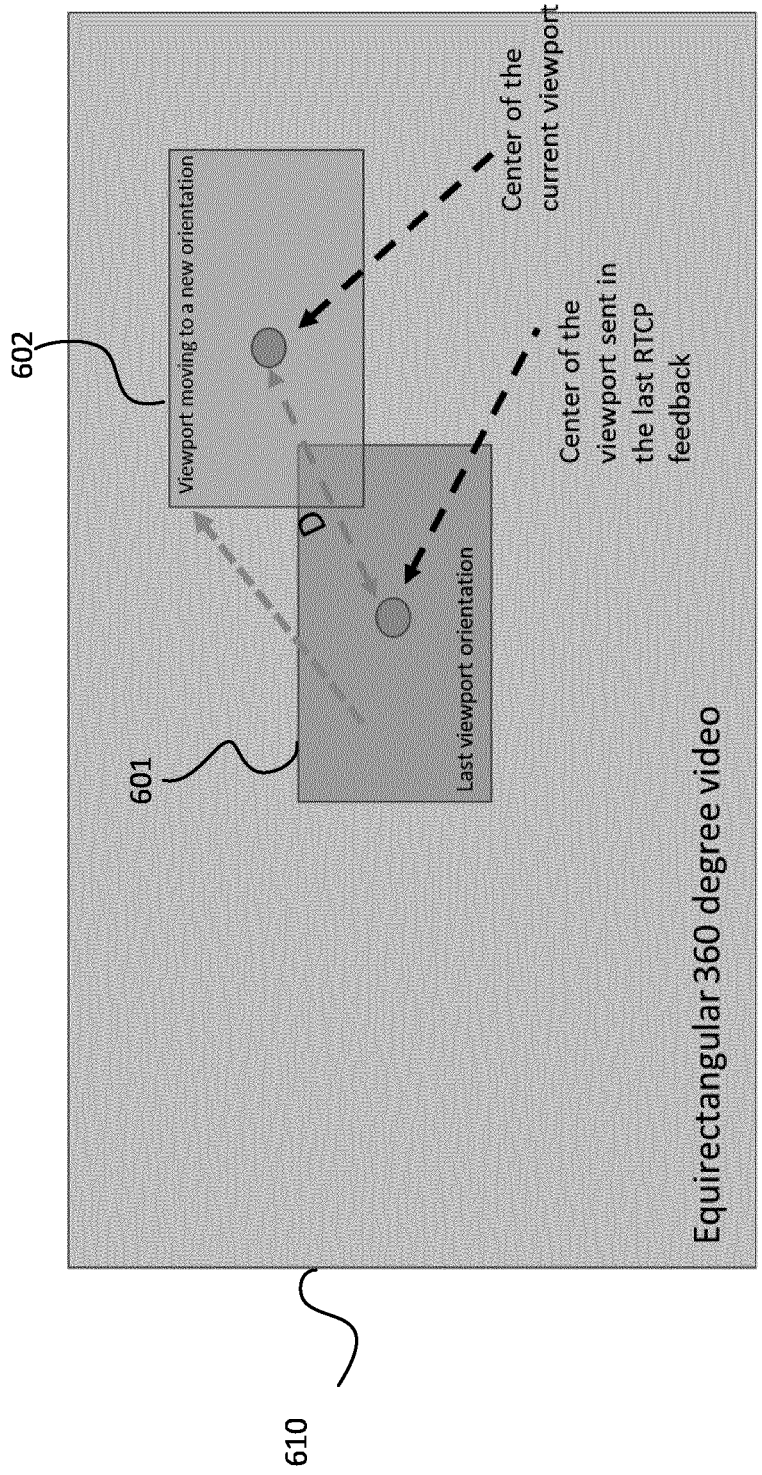
FIG. 6 shows another example of a equirectangular picture with a moving viewport.

The distance D is illustrated in FIG. 6, where a moving viewport 602 is shown on an equirectangular projection 610 of a 360-degree video. Parts of the projected picture 610 may be at higher quality (for the viewport and margin region). However, the method of example 2 does not need to be aware of that region.

In an embodiment, the distance D is calculated as the distance between the center of the high-quality region in the omnidirectional content and the center of the moving viewport, wherein the high-quality region is based on an earlier known or reported viewport orientation.

Receiver's RTCP logic comprises the following steps:
if the distance D is greater than a given threshold D', then the RTCP viewport early feedback is sent;
if the time T to the next scheduled RTCP viewport feedback is smaller than a given threshold T', then the next scheduled RTCP viewport feedback is suppressed.

The thresholds D' and T' may be signalled from the sender to the receiver (or vice versa) via SDP or other suitable protocol, or established through the device, application or other means.

The advantages of the Example 2, is for example, that the solution is independent of when the head motion starts. The solution is also independent of the boundary of high-quality region in the received content. The solution also requires fewer threshold values that are needed to be defined for the operation.

In some embodiments the viewport in Example 1 and Example 2 may be a predicted, presenter or recommended viewport in addition to or in the place of the actual viewport orientation at the receiver.

In previous description, examples and embodiments for conveying viewport information from the receiver to the sender have been described. In the previous embodiments, a head-mounted display has been used as an example of a rendering device. However, the term "rendering device" should be interpreted broadly. Rendering device is not only a head-mounted device, but can be any other device capable of rendering visual content. Also, a receiver device may provide a machine interface as a "rendering device", even though content provided by such means may not be watched by a human user.

Figure 7:
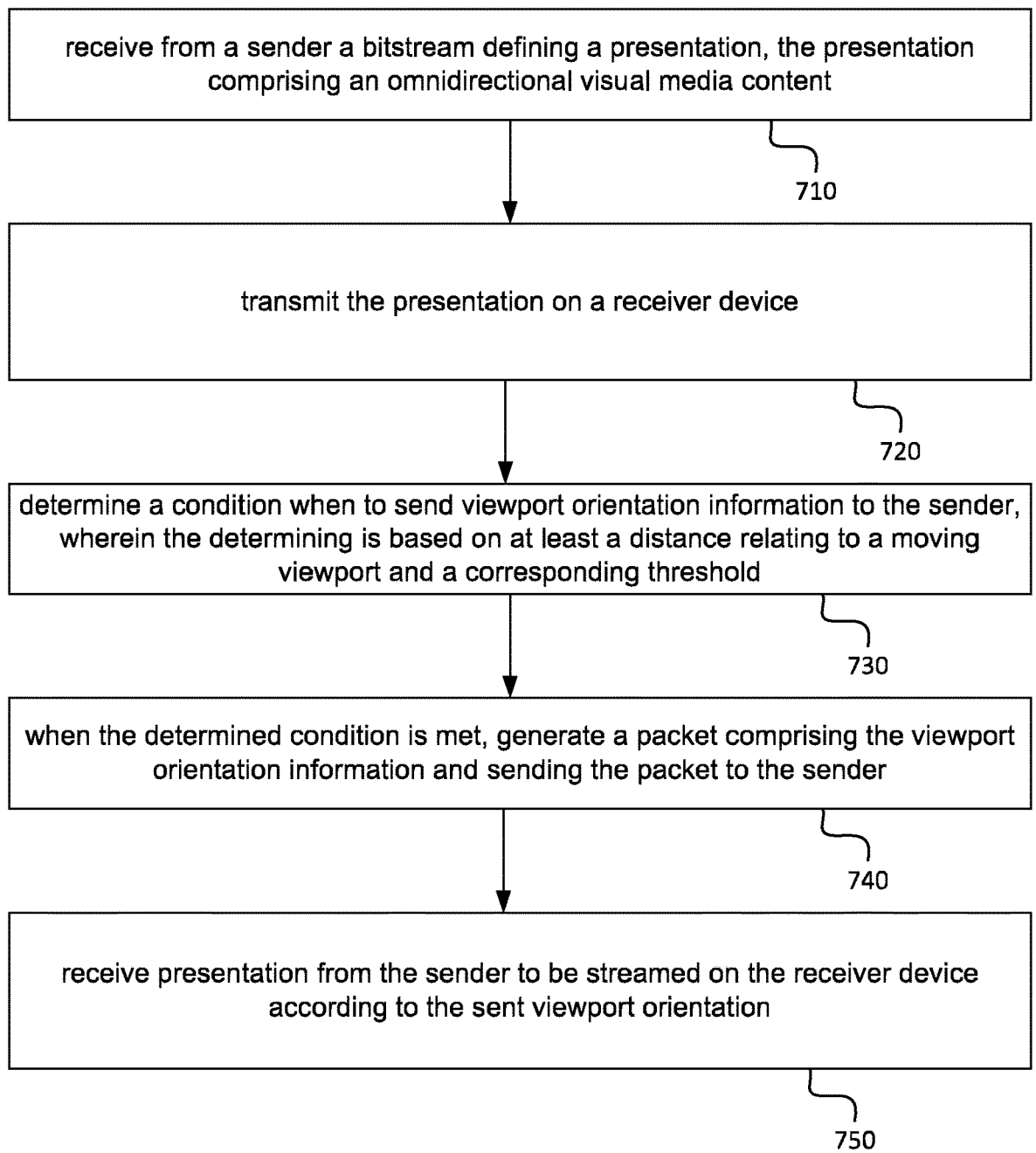
FIG. 7 is a flowchart illustrating a method according to an embodiment.

The method according to an embodiment is shown in FIG. 7. The method generally comprises receiving 710 from a sender a bitstream defining a presentation, the presentation comprising an omnidirectional visual media content; transmitting 720 the presentation on a receiver device; determining 730 a condition when to send viewport orientation information to the sender, wherein the determining is based on at least a distance relating to a moving viewport and a corresponding threshold; when the determined condition is met, generating 740 a packet comprising the viewport orientation information and sending the packet to the sender; and receiving 750 a presentation from the sender to be streamed on the receiver device according to the sent viewport orientation. Each of the steps can be implemented by a respective module of a computer system.

An apparatus according to an embodiment comprises means for receiving from a sender a bitstream defining a presentation, the presentation comprising an omnidirectional visual media content; means for transmitting the presentation on a receiver device; means for determining a condition when to send viewport orientation information, wherein the determining is based on at least a distance relating to a moving viewport and a corresponding threshold; means for generating a packet comprising the viewport orientation information and means for sending the packet to the sender, when the determined condition is met; and means for receiving a presentation from the sender to be streamed on the receiver device according to the sent viewport orientation. The means comprises at least one processor, and a memory including a computer program code, wherein the processor may further comprise processor circuitry. The memory and the computer program code are configured to, with the at least one processor, cause the apparatus to perform the method of FIG. 7 according to various embodiments.

Figure 8:
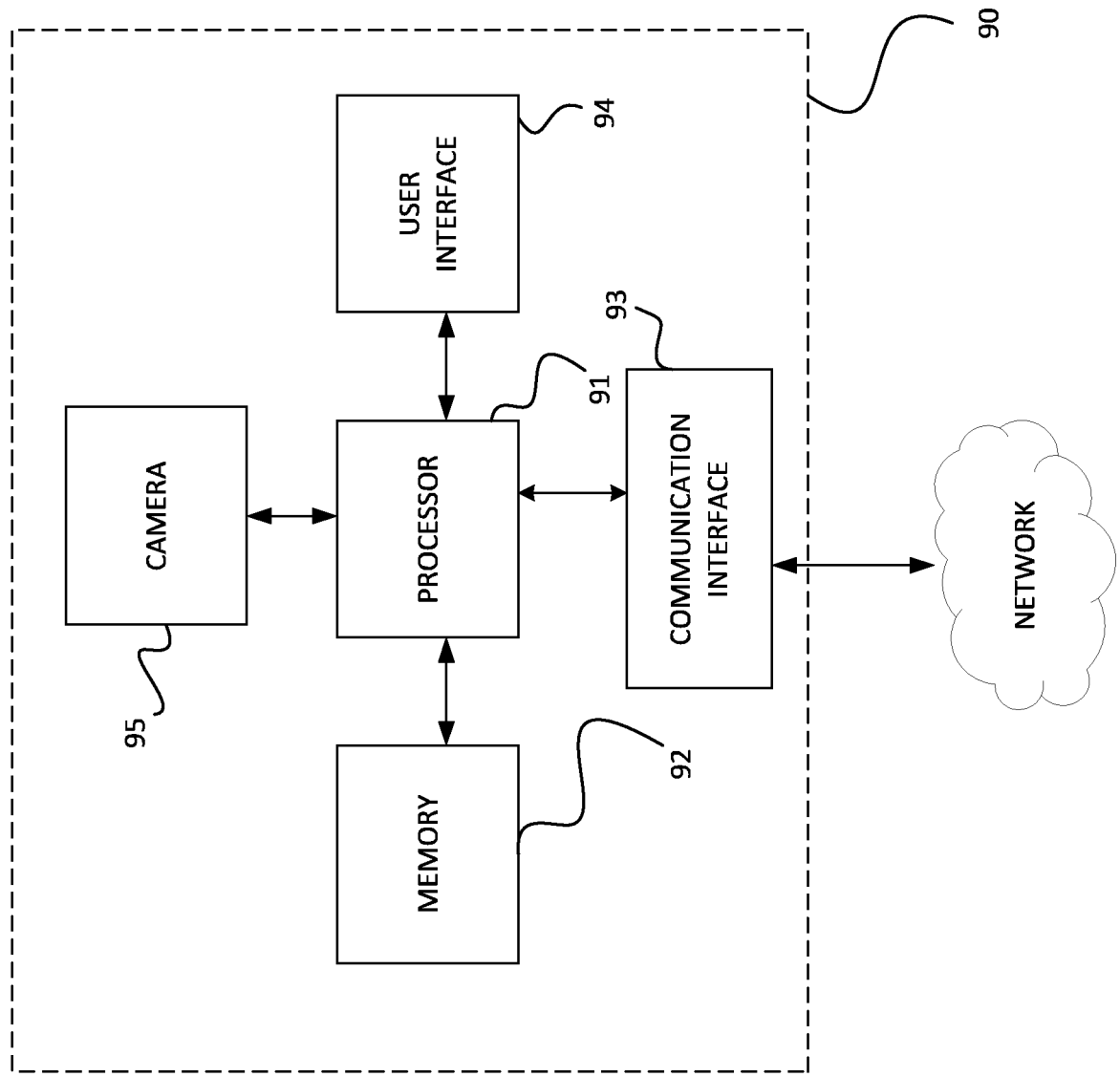
FIG. 8 shows an apparatus according to an embodiment.

An example of an apparatus is shown in FIG. 8. Several functionalities can be carried out with a single physical device, e.g. in a single processor, if desired. The apparatus 90 comprises a main processing unit 91, a memory 92, a user interface 94, a communication interface 93. The apparatus according to an embodiment, shown in FIG. 8, also comprises a camera module 95. The memory 92 stores data including computer program code in the apparatus 90. The computer program code is configured to implement the method according to flowchart of FIG. 6. The camera module 95 receives input data, in the form of video stream, to be processed by the processor 91. The communication interface 93 forwards processed data for example to a display of another device, such a HMD. When the apparatus 90 is a video source comprising the camera module 95, user inputs may be received from the user interface. If the apparatus 90 is a middlebox in a network, the user interface is optional, such as the camera module.

The various embodiments may provide advantages. For example, the embodiments provide improvements to the receiver's QoE (Quality of Experience) in viewport dependent delivery of 360-degree video in conversational environment.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment. The computer program code comprises one or more operational characteristics. Said operational characteristics are being defined through configuration by said computer based on the type of said processor, wherein a system is connectable to said processor by a bus, wherein a programmable operational characteristic of the system comprises receiving from a sender a bitstream defining a presentation, the presentation comprising an omnidirectional visual media content; transmitting the presentation on a receiver device; determining a condition when to send viewport orientation information to the sender, wherein the determining is based on at least a distance relating to a moving viewport and a corresponding threshold; when the determined condition is met, generating a packet comprising the viewport orientation information and sending the packet to the sender; and receiving a presentation from the sender to be streamed on the receiver device according to the sent viewport orientation.

A computer program product according to an embodiment can be embodied on a non-transitory computer readable medium. According to another embodiment, the computer program product can be downloaded over a network in a data packet.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. A method for consumption of omnidirectional visual media content, comprising:
   receiving from a sender a bitstream defining a presentation, the presentation comprising an omnidirectional visual media content;
   transmitting the presentation to a receiver device;
   determining a condition when to send viewport orientation information to the sender, wherein the determining is based on at least a distance relating to a moving viewport and a corresponding threshold;
   signaling the determined condition from the sender to the receiver device or from the receiver device to the sender;
   when the determined condition is met, generating a packet comprising the viewport orientation information and sending the packet to the sender;
   receiving a presentation from the sender to be streamed on the receiver device according to the sent viewport orientation; and
   using one or more of (1) a velocity of a rendering device and (2) the distance for the following:
      calculating time for the moving viewport to reach a margin boundary; and
      determining the condition for the viewport orientation information.

2. The method according to claim 1, wherein the distance is a distance between the moving viewport and the margin boundary.

3. The method according to claim 2, further comprising determining the velocity of the rendering device at a given time instance or continuously.

4. The method according to claim 1, wherein the distance is a distance between a center of the viewport and the center of the moving viewport.

5. The method according to claim 1, further comprising preventing sending an unscheduled viewport orientation message when a time to next scheduled viewport orientation message is shorter than a defined threshold.

6. A non-transitory program storage device readable by an apparatus, tangibly embodying a program of instructions executable with the apparatus for performing operations, the operations comprising the method as claimed in claim 1.

7. A non-transitory program storage device readable by an apparatus, tangibly embodying a program of instructions executable with the apparatus for performing operations, the operations comprising the method as claimed in claim 2.

8. A non-transitory program storage device readable by an apparatus, tangibly embodying a program of instructions executable with the apparatus for performing operations, the operations comprising the method as claimed in claim 3.

9. A non-transitory program storage device readable by an apparatus, tangibly embodying a program of instructions executable with the apparatus for performing operations, the operations comprising the method as claimed in claim 4.

10. An apparatus comprising:
    at least one processor; and
    at least one memory storing instructions, that when executed by the at least one processor, cause the apparatus at least to:
       receive from a sender a bitstream defining a presentation, the presentation comprising an omnidirectional visual media content;
       transmit the presentation to a receiver device;
       determine a condition when to send viewport orientation information, wherein the determine is based on at least a distance relating to a moving viewport and a corresponding threshold;
       signal the determined condition from the sender to the receiver device or from the receiver device to the sender;
       generate a packet comprising the viewport orientation information and send the packet to the sender, when the determined condition is met;
       receive a presentation from the sender to be streamed on the receiver device according to the sent viewport orientation;
       use one or more of (1) a velocity of a rendering device and (2) the distance to perform the following:
          determine the condition for the viewport orientation information; and
          calculate time for the moving vie h a margin boundary; and
       prevent sending an unscheduled viewport orientation message when a time to next scheduled viewport orientation message is shorter than a defined threshold.

11. The apparatus according to claim 10, wherein the distance is a distance between the moving viewport and the margin boundary.

12. The apparatus according to claim 11, wherein the at least one memory storing instructions is executed by the at least one processor, cause the apparatus to receive information on a margin from the sender.

13. The apparatus according to claim 11, wherein the apparatus is further caused to determine the velocity of the rendering device at a given time instance or continuously.

14. The apparatus according to claim 10, wherein the distance is a distance between a center of the last sent viewport orientation and the center of the moving viewport.

* * * * *